Feb. 27, 1951 — L. BESS — 2,543,431

VIDEO AMPLIFIER CIRCUIT

Filed Jan. 17, 1946

INVENTOR
LEON BESS

BY

William D. Hall

ATTORNEY

Patented Feb. 27, 1951

2,543,431

UNITED STATES PATENT OFFICE 2,543,431

VIDEO AMPLIFIER CIRCUIT

Leon Bess, Kansas City, Mo., assignor, by mesne assignments, to the United States of America as represented by the Secretary of War Application January 17, 1946, Serial No. 641,833

2 Claims. (Cl. 250—27)

This invention relates in general to electrical amplifier circuits, and more particularly to amplifier circuits adapted to handle video signals.

A problem in many types of amplifier design is the choosing of the input circuit so that so-called "recovery time" is as short as is practicable, at the same time there being other, and sometimes conflicting, demands on the constants of this coupling circuit. In particular, the video amplifier needed to pass square waves is particularly susceptible to an undesirably long recovery time unless the input time constant is made relatively large. In many instances, however, these amplifiers may be portions of equipment of a portable nature, the equipment being operated while in a truck or an airplane or some moving vehicle. The large amount of vibration associated with such vehicles may cause microphonics of an undesirably high amplitude to occur. If it is desired to design an input circuit to an amplifier which will provide a relatively high attenuation to these microphonics, it is seen that a small coupling condenser must be used, since the microphonics are in the lower frequency range. This small coupling condenser will give a small time constant to the input circuit, which is in conflict with the large time constant desired for a small recovery time.

Among the objects of this invention, therefore, are:

1. To provide an amplifier circuit capable of passing video signals with very little distortion; and 2. To provide such an amplifier circuit with a network that provides a high attenuation to microphonics.

In accordance with the present invention there is provided a resistance-capacitance video amplifier with a short-circuit-terminated delay line parallel to the grid leak resistor thereof. The time constant of the resistance-capacitance path is high so that an input square wave suffers very little distortion passing therethrough. Microphonics, on the other hand, are by-passed by the delay line to ground.

Figure 1:
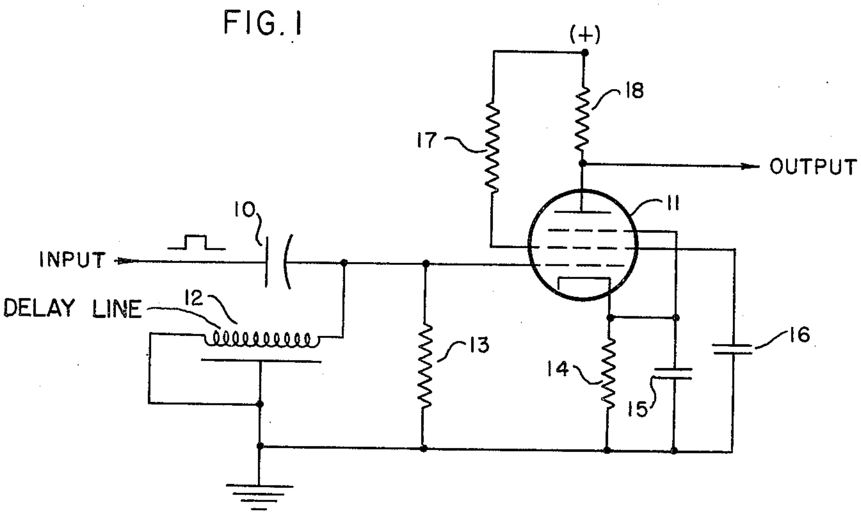

This invention will best be understood by reference to the drawings, in which:

Fig. 1 is a circuit diagram of one embodiment of the principles incorporated in the present invention; and Figs. 2A–2D show the various waveforms associated with the circuit of Fig. 1, and with the circuit minus the delay line coupling.

Referring now to a description of one embodiment of the invention and to Fig. 1, the input pulse is coupled through blocking condenser 10 to the control grid of pentode thermionic tube 11. Between this grid and ground is connected a delay line 12, the end other than the tube end being short-circuited. Across the delay line at the grid end thereof is a resistance 13 substantially equal to the characteristic impedance $Z_0$ of the delay line 12. The cathode of pentode 11 is tied to ground through the parallel network of resistor 14 and condenser 15. The screen grid is by-passed to ground for high frequencies through condenser 16, and has a positive potential fed to it through screen dropping resistor 17. The suppressor grid is tied directly to the cathode. The plate is connected through the plate load resistor 18 to a source of positive potential. The output is taken directly from the plate of the tube.

Figures 2A, 2B, 2C, 2D:
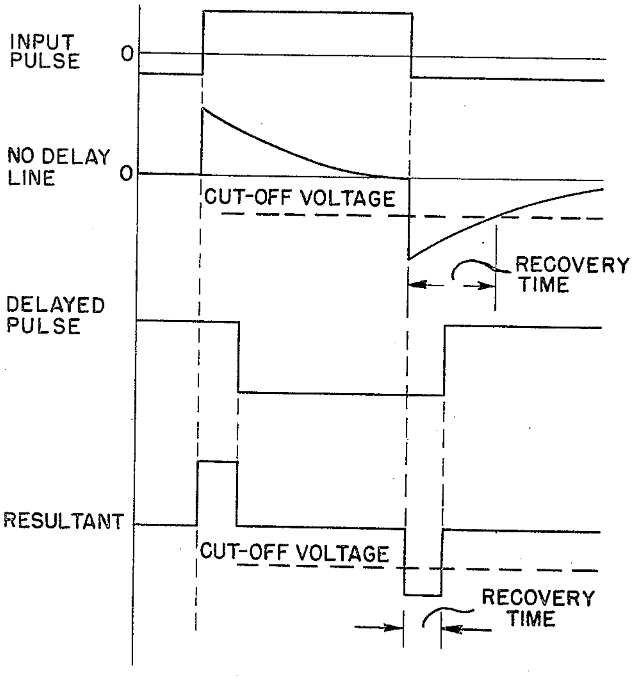

Referring now to the operation of this embodiment of the invention and to Fig. 1, let us first suppose that a square wave of voltage is applied to this amplifier stage as shown in Fig. 2A, there being no delay line present. The time constant as given by the product of resistance 13 and capacitance 10 may be of the same order of magnitude as the time length of the input square wave, in which case condenser 10 charges appreciably. Due to this charging action, some of this square wave of voltage is lost across condenser 10, with the result that the voltage appearing on the grid of tube 11 falls exponentially with time. This waveform is shown in Fig. 2B. The cut off voltage for the tube operating under the present set of quiescent electrode potentials is noted on Fig. 2B. At the termination of the input square wave the voltage on the grid of the tube may be pulled down below the cut off potential. Discharge of the condenser 10 must take place through resistor 13 and the output load impedance of the preceding network. It is seen, therefore, that it will take an appreciable period of time for the grid voltage to recover to the cut off potential of the tube. During this period of time the stage is inoperative and insensitive to input voltages, this period of time being called the recovery time of the stage. It is seen that it is desirable to obtain a recovery time that is as short as possible.

If the input time constant of this circuit was increased so that the grid potential would not be driven so far negative, microphonics which may exist in the input will go through the stage with very little attenuation. A short time constant circuit, on the other hand, will generally have a small condenser, which will provide a relatively higher impedance to the microphonics than will the grid leak resistor that may be used, with the result being an appreciable attenuation of these frequencies.

If a delay line is now used in the input network, as in the circuit shown in Fig. 1, a large condenser 10 and a relatively large resistor 13 may be used. This is permissible because the delay line 12 now acts as a low impedance bypass for the microphonics to ground, due to the direct path to ground through the series coils of the line in the ladder type of delay line, this type having series coils and shunt condensers. This resistor 13 may be large because it is desirable that it be substantially equal to the characteristic impedance $Z_0$ of the delay line. Due to the large time constant of the input circuit the input square wave, Fig. 2A, appears substantially undistorted on the grid of the tube. At the same time this square wave is sent down the delay line, is reversed in polarity by the short-circuited termination, and appears back on the grid of the tube as an undistorted square wave delayed by an amount equal to twice the delay of the delay line, this waveform being shown in Fig. 2C. The effective voltage on the grid of the tube, therefore, is the algebraic resultant of the voltage waveform of Fig. 2A and that of Fig. 2C. This resultant waveform is shown in Fig. 2D. It is seen that the recovery time of the stage is now equal to twice the inherent delay of the delay line, which may be made very short.

It is seen in Fig. 2D that the resultant pulse is now of a very much shorter time length than the original input pulse. This is not a disadvantage in systems which employ the time of occurrence of the leading edge of the pulse as a means of providing information, as in certain types of radio object-locating systems.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination, a source of square wave voltages and microphonics, a thermionic tube, a circuit including a capacitor connected between said source and a control element of said tube, a delay line connected between said control element and a point of reference potential, said line having a short-circuited termination, twice the inherent delay provided by said delay line being relatively short compared to the duration of said square wave voltage, and said delay line having a low impedance to low frequency microphonics whereby said microphonics are highly attenuated, and a resistance connected in shunt with said line, said resistance being of a value substantially equal to the characteristic impedance of said delay line, the value of said capacitor being such that the time-constant of the resistance-capacitance path is of the same order of magnitude as the duration of said square wave voltages, whereby said square wave voltages are applied to said circuit essentially undistorted.

2. A square wave amplifier circuit having a relatively short recovery time and providing a relatively high attenuation to microphonics comprising a thermionic tube, a delay line connected between a control element of said thermionic tube and a point of reference potential, said delay line having a short-circuited termination, a relatively large capacitor connected to said control element, a source of square wave input voltages coupled to said control element by said capacitor, and a resistance connected in shunt with said line, said resistance being of a value substantially equal to the characteristic impedance of the said delay line, the time constant of the resistance-capacitance path being of the same order of magnitude as the duration of said square wave input, and twice the inherent delay provided by said delay line being relatively short compared to the duration of said square wave input.

LEON BESS.

REFERENCES CITED

The following references are of record in the file of this patent:

UNITED STATES PATENTS

| Number | Name | Date |
|---|---|---|
| 2,211,942 | White | Aug. 20, 1940 |
| 2,266,154 | Blumlein | Dec. 16, 1941 |
| 2,433,379 | Levy et al. | Dec. 30, 1947 |
| 2,436,808 | Jacobsen et al. | Mar. 2, 1948 |